US012273342B2

(12) United States Patent
Collinge et al.

(10) Patent No.: US 12,273,342 B2
(45) Date of Patent: Apr. 8, 2025

(54) SECURE SERVER CLIENT INTERACTION

(71) Applicant: Mastercard International Incorporated, Purchase, NY (US)

(72) Inventors: Mehdi Collinge, Mont-Sainte-Aldegonde (BE); Omar Laazimani, London (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 131 days.

(21) Appl. No.: 17/584,671

(22) PCT Filed: Jun. 30, 2020

(86) PCT No.: PCT/US2020/040207
§ 371 (c)(1),
(2) Date: Jan. 26, 2022

(87) PCT Pub. No.: WO2021/025808
PCT Pub. Date: Feb. 11, 2021

(65) Prior Publication Data
US 2023/0370451 A1 Nov. 16, 2023

(30) Foreign Application Priority Data
Aug. 5, 2019 (EP) .................................... 19190122

(51) Int. Cl.
*H04L 9/00* (2022.01)
*H04L 9/40* (2022.01)
(52) U.S. Cl.
CPC .......... *H04L 63/0876* (2013.01); *H04L 63/12* (2013.01); *H04L 2463/081* (2013.01)

(58) Field of Classification Search
CPC ........................... H04L 63/0876; H04L 63/12
(Continued)

(56) References Cited

U.S. PATENT DOCUMENTS 8,126,145 B1 * 2/2012 Tewari ................. H04W 12/50
370/428
9,491,157 B1 * 11/2016 Amdahl ................ H04L 67/56
(Continued)

OTHER PUBLICATIONS

European Search Report dated Oct. 4, 2019 which was issue in connection with EP 19190122.2.
(Continued)

*Primary Examiner* — Christopher J Brown
(74) *Attorney, Agent, or Firm* — Buckley, Maschoff & Talwalkar LLC

(57) ABSTRACT

A method of maintaining a secure relationship between a client device and a server is described. The client device receives a first challenge from the server and determines and provides a first response to the first challenge. A cookie is established associated with the secure relationship. This cookie is shared between the client and the server. To establish the secure relationship in a later interaction, the client provides the cookie to the server. The server then provides both the first challenge and a second challenge, to which the client determines a first response and a second response. The client then provides a composite response from which the first response and the second response are derivable by the server, allowing the server to be assured that the secure relationship exists. Each challenge uses a challenge function adapted to provide a fingerprint of the client device. Methods at both client and server, and suitably configured client and server, are also described.

15 Claims, 8 Drawing Sheets

(58) Field of Classification Search
USPC .............................................................. 726/6
See application file for complete search history.

(56) References Cited

U.S. PATENT DOCUMENTS

| | | | |
|---|---|---|---|
| 9,807,092 | B1 | 10/2017 | Gutzmann |
| 2010/0250921 | A1 | 9/2010 | Spencer et al. |
| 2012/0131340 | A1* | 5/2012 | Teuwen ................ H04L 9/3273 |
| | | | 713/168 |
| 2013/0086679 | A1 | 4/2013 | Beiter |
| 2017/0019423 | A1 | 1/2017 | Kotwal et al. |
| 2017/0180373 | A1* | 6/2017 | Shao ................... H04L 63/0876 |
| 2018/0294979 | A1 | 10/2018 | Ikarashi |
| 2019/0165954 | A1 | 5/2019 | Lu |

OTHER PUBLICATIONS

International Search Report and Written Opinion dated Oct. 13, 2020 which was issue in connection with PCT/US2020/040207.

* cited by examiner

| Device/Browser Characteristics | Source | Avg. identifying information (bits) | Example |
|---|---|---|---|
| User Agent | HTTP request | ~ 11.3 | Mozilla/5.0 (Macintosh; Intel Mac OS X 10_13_6) AppleWebKit/537.36 (KHTML, like Gecko) Chrome/72.0.3626.81 Safari/537.36 |
| HTTP_ACCEPT Headers | HTTP request | ~ 17.9 | text/html, \*/\*; q=0.01 gzip, deflate, br en-GB,en;q=0.9,fr-FR;q=0.8,fr;q=0.7,ar-MA;q=0.6,ar;q=0.5,en-US;q=0.4 |
| Browser Plugins Details | JavaScript | ~ 2.8 | Plugin 0: Chrome PDF Plugin; Portable Document Format; internal-pdf-viewer; (Portable Document Format; application/x-google-chrome-pdf; pdf)... |
| Screen Size and Color Depth | JavaScript | ~ 5.1 | 1680x1050x24 |
| System Fonts | JavaScript | ~ 3.6 | Andale Mono, Arial, Arial Black, Arial Hebrew, Arial Narrow,... |
| Hash of canvas | JavaScript | ~ 8.4 | c56d9c10255b809c0b99228d5a46fa28 |
| Hash of WebGL | JavaScript | ~ 6.8 | 6686a20396178ea5075e242c890b54b5 |
| Language | JavaScript | ~ 4 | en-GB |
| Platform | JavaScript | ~ 3 | MacIntel |

Figure 6

SECURE SERVER CLIENT INTERACTION

CROSS-REFERENCE TO RELATED APPLICATION

This application claims the benefit of, and priority to, European Patent Application No. 19190122.2 filed on Aug. 5, 2019, and PCT/US20/040207 filed on Jun. 30, 2020. The entire disclosure of the above-referenced application is incorporated herein by reference.

FIELD OF DISCLOSURE

The present disclosure relates to secure interaction between a server and a client. In particular embodiments, the disclosure relates to allowing a server to ensure that interactions with a specific device client can be trusted.

BACKGROUND OF DISCLOSURE

In interaction between a server and a browser on a client computer, cookies are generally used for a variety of functions. A cookie is a small piece of data held at the client with associated data at the server which allows the server to determine or remember some aspect of the state of the client. This allows new web browsing sessions to use earlier interactions between the client and the server to inform a new session while the underlying protocols can be stateless.

Cookies are used for a number of purposes, one of which is authentication—for example, to indicate whether a user is logged in to a service, and to indicate an account that the user has used in logging in. This may be a prerequisite for the server to pass sensitive information to the client, which may require the server to be confident in the security of elements of the process, such as that the user browser and device are secure, or that the user is properly authenticated at the user device. Cookies may be encrypted to reduce the risk of attack by third parties, but this requires a mechanism to manage encryption keys and to ensure that they are stored in a secure way on the device client in the event that the client has to access encrypted data.

This type of approach may be used in a variety of contexts where a user is accessing an online service of some kind where sensitive information is exchanged, or where there are significant consequences to the interaction. Online purchase and access to online transaction systems fall into this category. However, it is relevant to a wide variety of contexts in order to provide security for both service providers and users of a service.

Such a cookie may be used to assure the server that a trusted relationship has been established between the server and the user device—this may, for example, have established that the server can trust the browser and device combination in the user device. A typical server client relationship is shown in FIG. 1. The user device 1—in principle, any computing device using a browser 11 in a client-server relationship with a server 12—has a processor 2 and a memory 3 using an operating system 6 to define a computing environment 4 in which the browser 11 runs, cookies 5 for the browser being stored in the memory in association with the browser 11. The server 12 similarly has its own computing environment 14 with processor 22 and memory 23 and operating system 26, in this case running service software 25. Cookies 15 associated with the service software 25 are stored in the server memory 23 with associated data 27. This is of course a minimal description of each system—what is described here as "server 12" may be a much more complex system involving multiple computing systems, but for the purposes of describing this interaction, it can be considered as a single system.

A conventional approach to using cookies in this context is shown in FIG. 2a, and a potential attack by a third party is shown in FIG. 2b. To establish a trusted relationship which allows the user device 1 to access a secure service using its browser 11, the user device 1 provides various static data to identify the user device 1 to the server 12. This static data is chosen to identify the user device 1—or the device/browser combination—uniquely, and the server 12 then uses this static data to generate a device fingerprint which it associates with a cookie, which it then provides to the user device 1. The cookie may simply be a UUID or other effectively unique identifier. The device fingerprint is held at the server 12 in association with the cookie. In a subsequent interaction, the browser provides the cookie and access to the secure service is provided if the user device is also able to provide the static data to establish that it is the same browser running on the same device as originally identified.

A possible attack is shown in FIG. 2b. A malicious third party 21 acquires a degree of access to the user device 1, allowing it to obtain various information items from that device. The third party also develops knowledge of the requirements of the trusted service—for example, by legitimate interaction with another account—and can therefore determine the static data that would be required by the server 12. The third party then obtains the cookie and the static data and attempts to emulate the user device/browser combination—the third party is able to provide both the cookie and the device/browser identifying static data as it has already obtained this static data for the user device 1. This allows the attacker to emulate the user device 1 and gain access to sensitive or restricted resources from the server.

It would be desirable to establish a trusted relationship between a browser running on a user device and a server, using a cookie-based approach if possible for convenience of all parties, but without risk of this type of attack.

SUMMARY OF DISCLOSURE

In a first aspect, the disclosure provides a method of maintaining a secure relationship between a client device and a server, the method comprising at the client device: receiving a first challenge from the server and determining and providing a first response to the first challenge; establishing a cookie associated with the secure relationship wherein the cookie is shared with the server; providing the cookie to the server to maintain the secure relationship; receiving the first challenge and a second challenge from the server; and determining the first response and a second response to the second challenge, and providing a composite response from which the first response and the second response are derivable by the server; wherein each challenge uses a challenge function adapted to provide a fingerprint of the client device.

This approach allows the server to establish that it is interacting with the same client device with which it has originally established a secure relationship, but does so uses a dynamic mechanism so that attacks based on obtaining static data from the client device will not be effective.

Preferably, the fingerprint of the client device is a fingerprint of a device and browser combination for the client device. It is typically the device and browser combination, rather than simply the device, that the server will need to rely upon, so it is desirable for the fingerprint to establish this. In such embodiments, the challenge function may relate to rendering by the browser of the client device. This can be a particularly effective approach because the resulting rendered image should be specific to the graphics processing unit (GPU) (and associated drivers) used by the browser for hardware acceleration, and so well adapted to support a device fingerprint.

Using this approach, the challenge function may comprise JavaScript routines relating to rendering by the browser, for example by using a process that comprises one or more of Canvas and WebGL functions. Such a challenge function may comprise an XOR of a Canvas challenge and a WebGL challenge, or any other function that combines such challenges in an effective way.

The client device may be adapted to generate a seed and provide the seed to the server as part of the composite response. This seed may be used to generate a message authentication code derived from the first response. The client device may receive random data from the server, and wherein the composite response may then comprise a first response part generated by operation of the message authentication code on the random data. Such an operation may comprise a keyed-hash function. The composite response may have a second response part comprising the second response encrypted by the first response.

In embodiments, the cookie is stored at the client device but none of the challenges or the responses are stored at the client device. This enhances security, as it allows for an effective interaction even if static data at the client device is open to attack by third parties.

In a second aspect, the disclosure provides a computing device comprising a processor, a memory and a communication means, wherein the computing device is adapted to carry out the method of the first aspect as described above.

In a third aspect, the disclosure provides a method of maintaining a secure relationship between a client device and a server, the method comprising at the server: establishing a first challenge and receiving a first response to the first challenge from the client device; establishing a cookie associated with the secure relationship wherein the cookie is shared with the client device; receiving the cookie from the client device to maintain the secure relationship; determining a second challenge, and providing the first challenge and the second challenge to the client device; receiving a composite challenge response from the client device, and deriving the first response and a second response to the second challenge from the composite challenge response; wherein each challenge uses a challenge function adapted to provide a fingerprint of the client device.

Preferably, the fingerprint of the client device is a fingerprint of a device and browser combination for the client device. The challenge function may relate to rendering by the browser of the client device, and may comprise JavaScript routines relating to rendering by the browser, such as by using a process that comprises one or more of Canvas and WebGL functions. The challenge function may comprise an XOR of a Canvas challenge and a WebGL challenge, or any other function that effectively combines both challenge types.

In embodiments, the server may reject the composite response if it is received more than a predetermined time after the first challenge and second challenge are sent to the client device. This is a further line of defence against the possibility that the client device has been subverted by a third party, and is being controlled remotely. In such a case, the response will be provided more slowly because of the additional messaging and computation required, so the risk can be removed by time limiting the response in this way. For example, the predetermined time may be of the order of two seconds to achieve this result.

The server may provide random data with the first challenge and the second challenge. The composite response may then comprise a first response part involving the operation of the first response on the random data by which the server then validates that the client device has produced the first response. The composite response may further comprise a seed, wherein a message authentication code is generated from the seed and the first response, and wherein the first response part comprises a hash of the message authentication code and the random data.

The composite response may comprise a second response part comprising the second response encrypted by the first response, wherein the server uses the first response to decrypt the second response.

In a fourth aspect, the disclosure provides a server comprising a processor, a memory and communication means and adapted to perform the method of the third aspect as set out above.

BRIEF DESCRIPTION OF FIGURES

Embodiments of the disclosure will now be described, by way of example, with reference to the accompanying figures, of which:

FIG. 6 illustrates possible choices for fingerprinting a device/browser combination on a user computer for use in embodiments of the disclosure;

DESCRIPTION OF SPECIFIC EMBODIMENTS

General and specific embodiments of the disclosure will be described below with reference to the figures.

Figure 1:
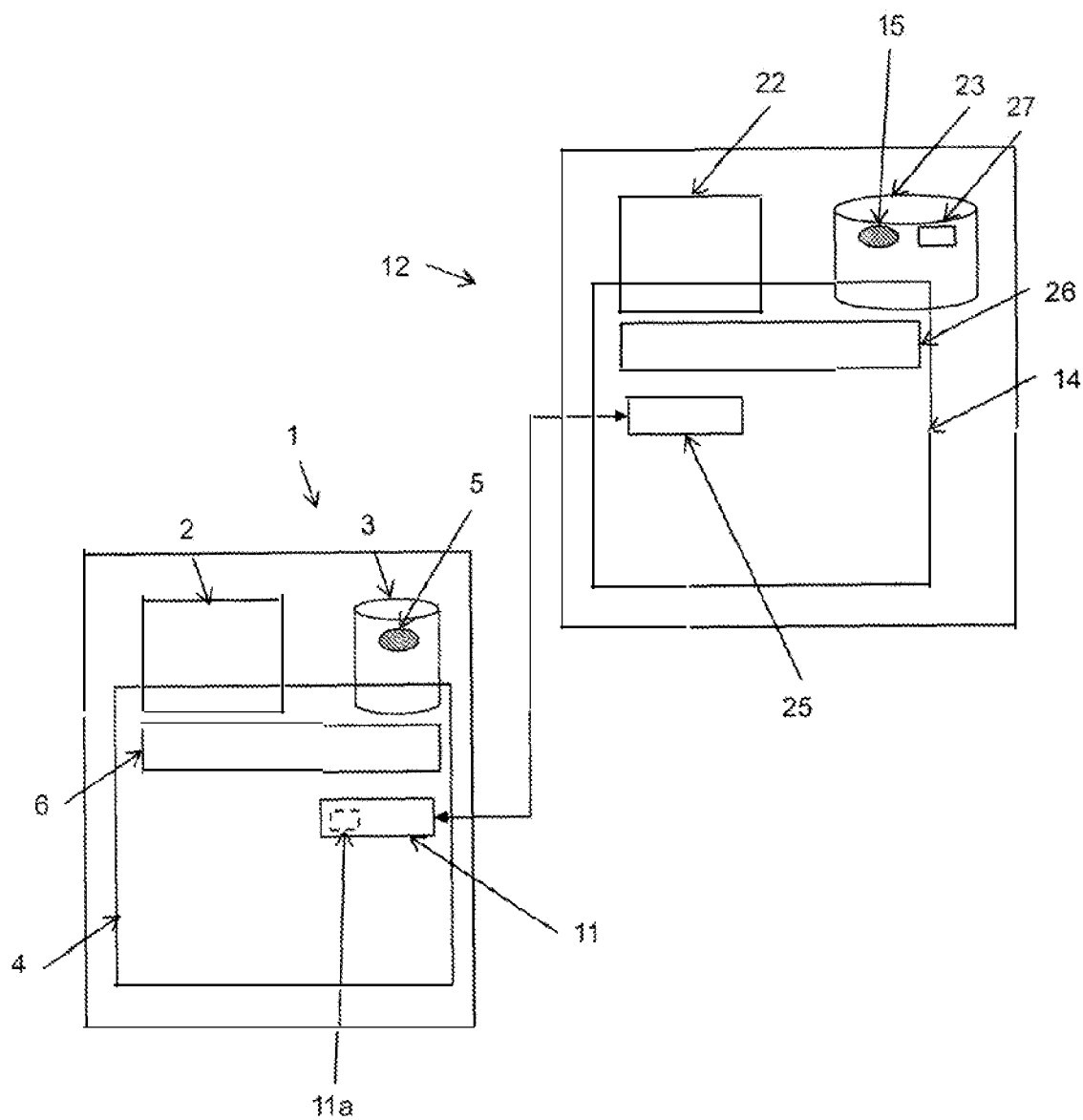
FIG. 1 shows elements of a server client architecture in which embodiments of the present disclosure may be employed.

FIG. 1 illustrates the elements of a typical server client architecture, as discussed above. To recapitulate, the user device 1—in principle, any computing device using a browser 11 in a client-server relationship with a server 12—has a processor 2 and a memory 3 using an operating system 6 to define a computing environment 4 in which the browser 11 runs, cookies 5 for the browser being stored in the memory in association with the browser 11. There may be, in some cases, a client application 11a running on the browser 11. The server 12 similarly has its own computing environment 14 with processor 22 and memory 23 and operating system 26, in this case running service software 25. Cookies 15 associated with the service software 25 are stored in the server memory 23. This is of course a minimal description of each system—what is described here as "server 12" may be a much more complex system involving multiple computing systems, but for the purposes of describing this interaction, it can be considered as a single system. Cookies may also in some cases not be stored as such, but regenerated as needed based on associated data.

Figure 3:
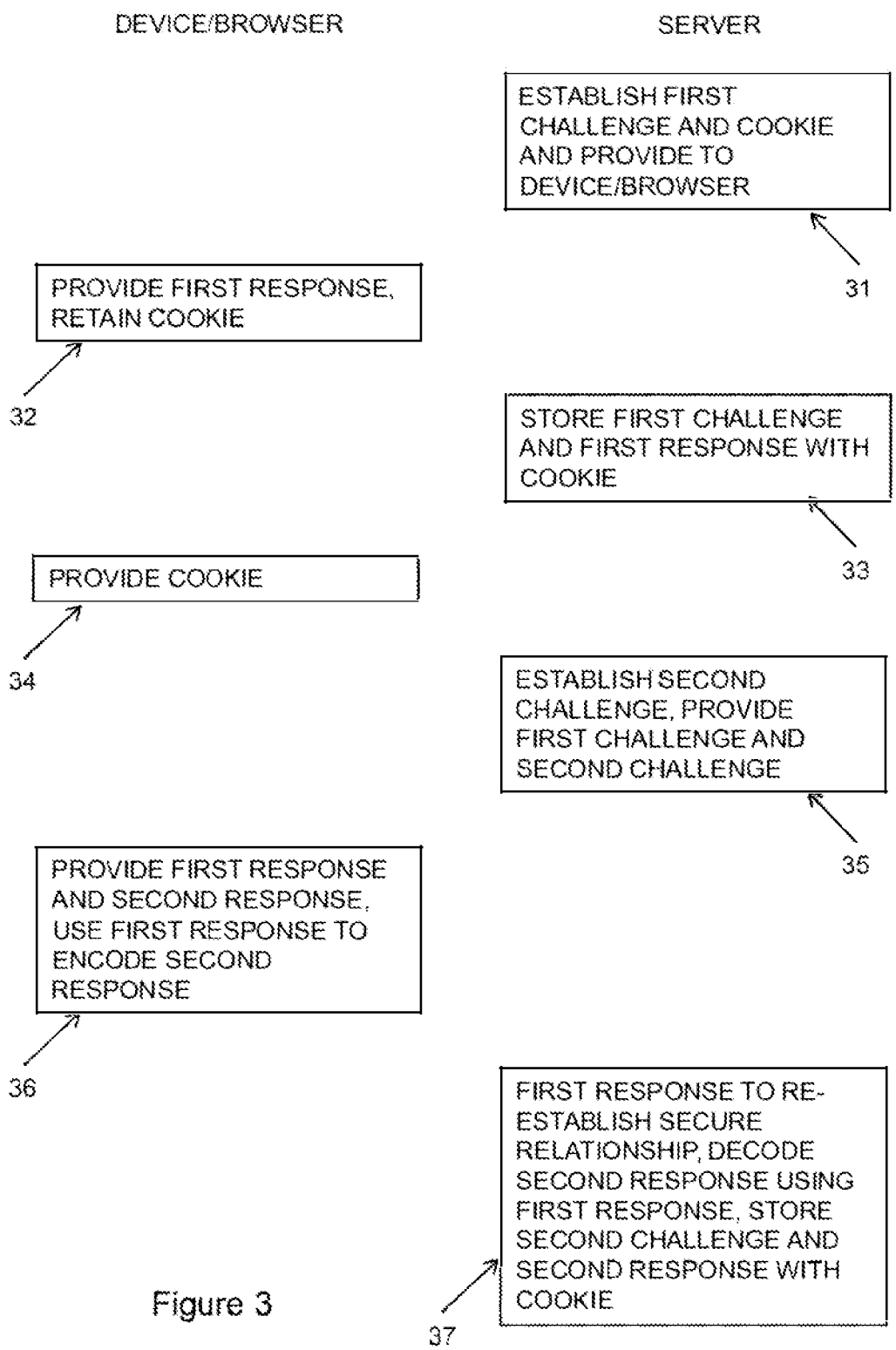
FIG. 3 is a flow diagram showing an embodiment of the disclosure in general terms.

A general embodiment of a method according to the disclosure is indicated in FIG. 3. The first step 31 is to establish a first challenge, and associate it with a cookie. As will be described, a preferred choice of challenge is adapted to identify a device/browser combination, and would be either impossible to emulate or sufficiently challenging that any attempt to emulate it would be detected. This may be achieved by making the challenge dynamic, rather than dependent on static data.

The next step 32 is for the client/browser combination to provide a first response—based on its own device and/or browser properties—to the first challenge, and to send this to the server. Preferably only the cookie is retained at the client, to reduce the risk of attack. The server stores 33 the first challenge and the first response with the cookie.

Subsequently, the device/browser provides 34 the cookie to the server to re-establish the trusted connection between the two, typically in a new browsing session. At this point the server establishes a second challenge and provides 35 both the first challenge and the second challenge to the device/browser. The device/browser determines both the first response and the second response, and after using the first response to encode the second response, provides 36 this result as a reply to the server. The server then determines 37 that the first response is correct to re-establish the relationship, uses the first response to determine the second response, and stores the second challenge and the second response with the cookie to use in establishing the relationship the next time.

This approach combines a dynamic challenge/response mechanism with a reliable device/browser fingerprint to reduce the risk of attack significantly.

A detailed description of an embodiment of such a process will be described with reference to FIGS. 4 to 6. There is an initial set up step shown in FIG. 4, with subsequent interactions all taking the same pattern as shown in FIG. 5.

Figure 4:
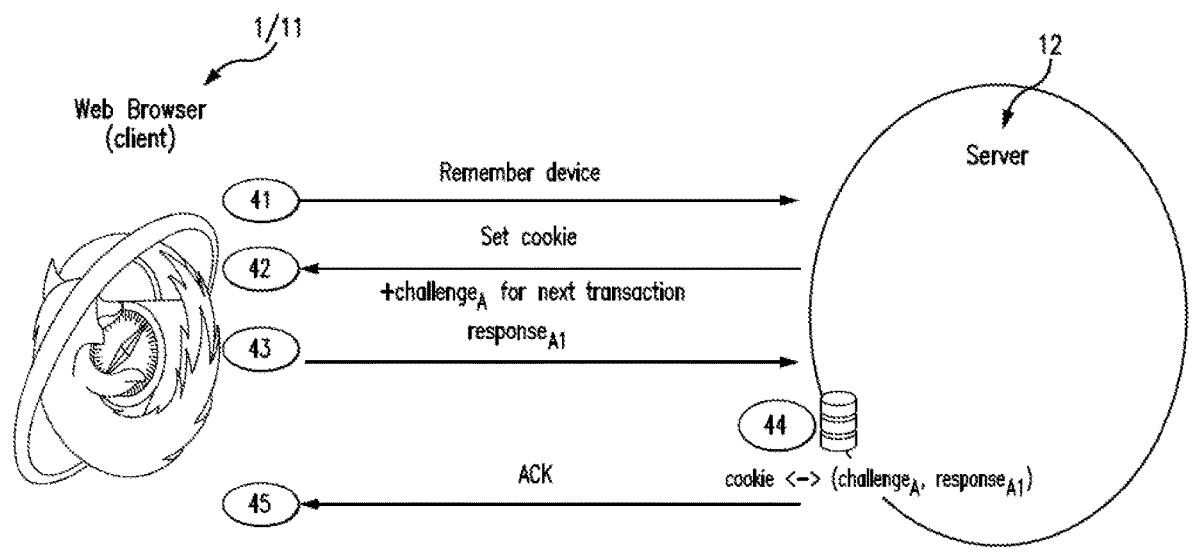
FIG. 4 shows a first interaction between a server and a client/browser combination according to an embodiment of the disclosure.
Figure 5:
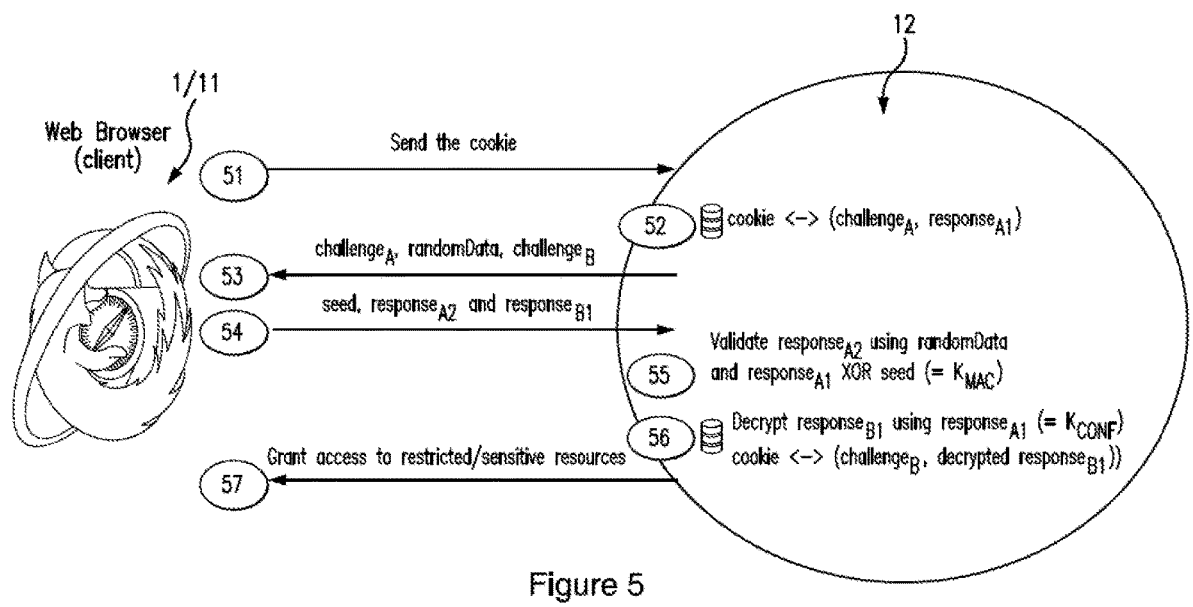
FIG. 5 shows a subsequent interaction between the server and the client browser/combination of FIG. 5.

FIG. 4 shows interactions between the web browser 11 of the client computer 1 and the server 12. First of all, a request to be remembered 41 is initiated from the client computer 1 (this may be in response to a request to accept a cookie from the server 12, or may be incorporated as part of another registration process). In the context in which such embodiments are expected to be used, this is likely to be associated with provision of some service by the server 12 to the client computer 1 for which it is desirable that the server 12 establishes that the client computer 1 or more specifically the combination of client computer 1 and browser 11 can be trusted.

The next step is for the server 12 to set the cookie and to transmit it to the browser 11. In itself, the cookie can have any conventional format, and will be stored in memory 3 at the client computer 1 in the normal way. The cookie may include other technologies to achieve secure and efficient identification and information provision—for example it may be a Nudetect cookie (a technology provided by NuData Security), described in general terms at https://nudatasecurity.com/solutions/nudetect/. The information associated with the cookie and stored in association with it at the server 12 will however be quite different. In initial setting of the cookie, the server 12 sends 42 not only the cookie but also a challenge (challenge$_A$) that will be used in a later interaction (the next time that the cookie is presented). In this case, the challenge comprises details of an image to be rendered at the client computer 1—a random clip-space set of coordinates and colors to be rendered on the client side using standard JavaScript APIs Canvas and WebGL. This process, and alternative approaches that may be used in alternative embodiments, is described further below with reference to FIG. 6. The reason for taking this approach is that the resulting rendered image (IMG) is expected to be specific to the graphics processing unit (GPU) (and associated drivers) used by the browser for the hardware acceleration and support a form of identification of a device, so can be used as a fingerprint for the client computer 1 (or, more specifically, the client computer 1 and browser 11 combination).

On receiving the cookie and the challenge, the client computer 1 calculates a response (response$_{A1}$) to the challenge. Here this is done using Canvas and WebGL as a part of a function defined in the challenge, but this function may be derived from a combination of different browser/device fingerprinting techniques. The browser 11 then sends 43 this response to the server 12. As it is the client computer 1 that is treated as under threat of attack, neither the challenge nor the response is stored at the client computer 1. However when the response has been received, both the challenge challenge$_A$ and the response response$_{A1}$ are stored 44 at the server 12 in association with the cookie, and the server acknowledges 45 to the browser 11 that this has been done. At this point the cookie has been set and associated with a fingerprint of the client computer and browser combination, but with only a cookie held at the client device.

FIG. 5 illustrates a subsequent interaction (in this case, specifically the next interaction, but further interactions adopt a directly comparable pattern) between the client browser 11 and the server 12. The browser 11 provides 51 the cookie to the server 12 in a conventional way to indicate that it is known to the server 12—here, the cookie also indicates that the trusted device/browser relationship with the server should be re-established. The server 12 determines 52 what is stored against the cookie—this will be the previous challenge and the response to the previous challenge, in this case challenge$_A$ and response$_{A1}$. As will be described below, response$_{A1}$ is effectively used as a cryptographic key, and is also termed $K_{CONF}$ below. In the next step, the server 12 sends 53 both the old challenge challenge$_A$ and a new challenge challenge$_B$, together with some random data RandomData. The client computer 1 uses this information in the following ways. $K_{CONF}$ is calculated by the client computer 1 using challenge$_A$, so both the client computer 1 and the server 12 have this information. A seed (seed) is generated by the client, and a new key $K_{MAC}$ is derived from, but also distinguished from, $K_{CONF}$—for example, $K_{MAC}$=seed XOR $K_{CONF}$ The value seed is preferably ephemeral and random. The responses to the challenges as provided by the client computer 1 are slightly different in form from those at the setup stage, and now allow for validation at the server 12 together with the storage of a challenge and response pair for use in the next interaction (again, these will only be stored at the server 12, and not at the client computer 1). The response to the original challenge is not simply the challenge result ($K_{CONF}$), but a value derived from it, in this case a conventional keyed hash using the derived key $K_{MAC}$ and RandomData:

response$_{A2}$=HMAC-SHA256($K_{MAC}$,randomData)

The response to the new challenge is determined as before using $Fn(\text{challenge}_B)$, but this is now encrypted by the key formed from the original challenge, $K_{CONF}$ $$\text{response}_{B1} = ENC(K_{CONF}, Fn(\text{challenge}_B))$$

The client computer 1 sends 54 seed, response$_{A2}$ and response$_{B1}$ to the server 12. The server is able to validate 55 the response by evaluating response$_{A2}$ as it already has $K_{CONF}$ and randomData, and has received seed from the client computer 1, so it can generate an expected value of response$_{A2}$ itself. If the values of response$_{A2}$ match, the server will then decrypt 56 response$_{B1}$ using $K_{CONF}$, to create the new challenge and response pair, challenge$_B$ and response$_{B1}$. Consequently, response$_{B1}$ will be the new value of $K_{CONF}$ for the next challenge. The server 12 will then grant access 57 to restricted or sensitive resources as required, as it has re-established a trusted relationship with the computer/browser pair of the client.

Figure 2A:
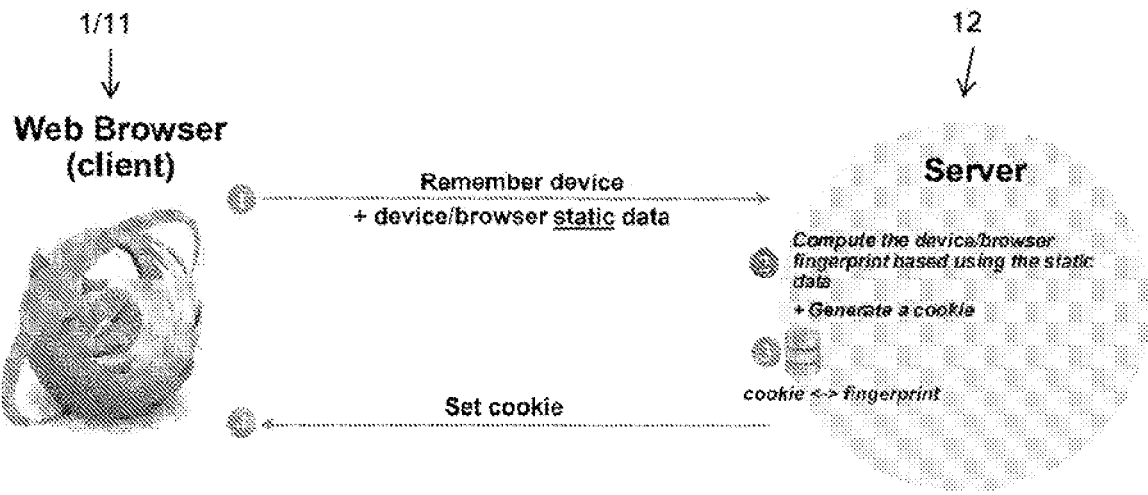
FIG. 2a shows operation of existing cookie based systems to establish a persistent relationship between a server and a device browser combination and FIG. 2b indicates how this approach may be open to third party attack.
Figure 2B:
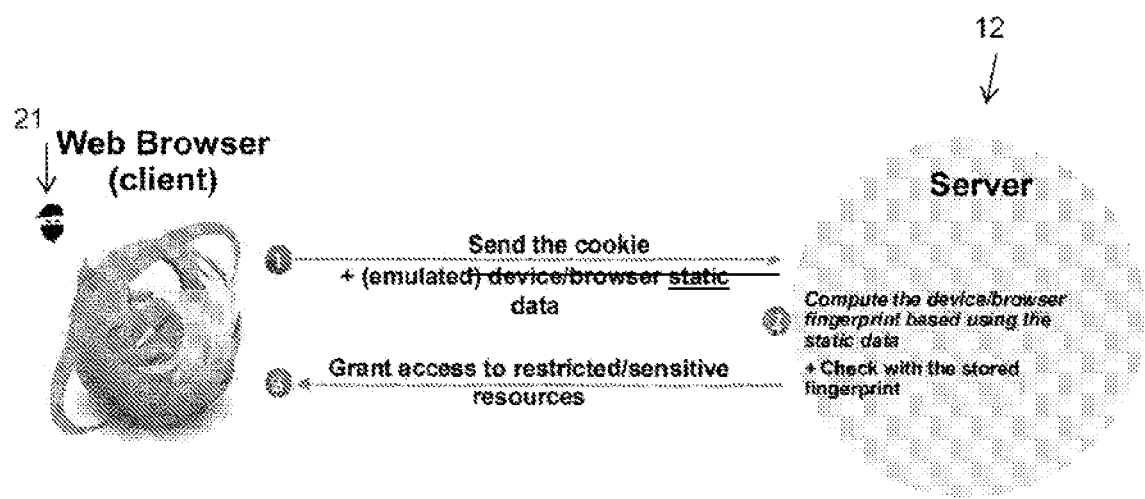

Using the approach shown in FIG. 5, the type of attack discussed in FIGS. 2a and 2b above will not be effective. Even if the attacker is able to obtain the cookie, it will not be able to emulate the client computer and browser combination in such a way as to provide a correct response to the challenge, and the server 12 will not provide the attacker with access to sensitive resources. Further steps can be taken to minimise the risk of attack, in particular measuring at the server 12 the time taken between the provision 53 of the challenges to the user computer 1 and the provision 54 of the responses to the challenges back to the server 12. If a time threshold of about two seconds is set, this should allow the responses to be generated at the user computer 1, but any attempt by an attacker to take control of the user computer 1 and then obtain the challenges, render the required images and compute the required HMAC would take longer than this.

Suitable options for a challenge are now discussed further with reference to FIG. 6. FIG. 6 considers different characteristics of a device/browser combination. In general, these will change over time or between interactions for a particular device/browser combination. Various characteristics—Screen Size and Color Depth; Canvas hashing; WebGL hashing; and Platform—will not. Of these characteristics, there is some difference in ease of emulation—in particular, Screen Size and Color Depth may be possible to emulate, as may Platform. This leaves Canvas and WebGL as good candidates for a challenge function, with a combination of the two being particularly attractive.

Generally in computer science a canvas (https://en.wikipedia.org/wiki/Canvas_(GUI)) is a container that holds various drawing elements which is used to construct a user interface. It is implemented in JavaScript for use in web browsers. A suggested approach is to use Canvas Text using WebFont. A challenge may contain a random webfont, random text and a text baseline. The function will render the text image in a canvas to obtain a result ($IMG_1$), which may then be hashed ($hash_1 = SHA\text{-}256(IMG_1)$). Canvas is generally supported in web browsers.

WebGL (http://en.wikipedia.org/wiki/WebGL) is JavaScript API for rendering interactive 2D and 3D graphics with any compatible web browser. WebGL 1.0 is widely supported in web browsers and would be an appropriate choice—WebGL 2.0 is currently less well supported but may be a suitable choice at a future date when support is more general. A suggested approach is to perform a function on a clip-space of random shape coordinates and colours, and then to calculate a hash in same way as for Canvas ($hash_2 = SHA\text{-}256(IMG_2)$).

These two results can then be combined into a single response, for example the following:

$$Fn(\text{challenge}) = hash_1 \text{ XOR } hash_2$$

While embodiments of the disclosure may be employed in other server client contexts, a context of particular interest is that of online transactions made using a transaction scheme (also termed a payment scheme). Such transactions are made using a payment network, the payment network provider enabling transactions between a customer and a merchant supported by their respective banks.

Figure 7:
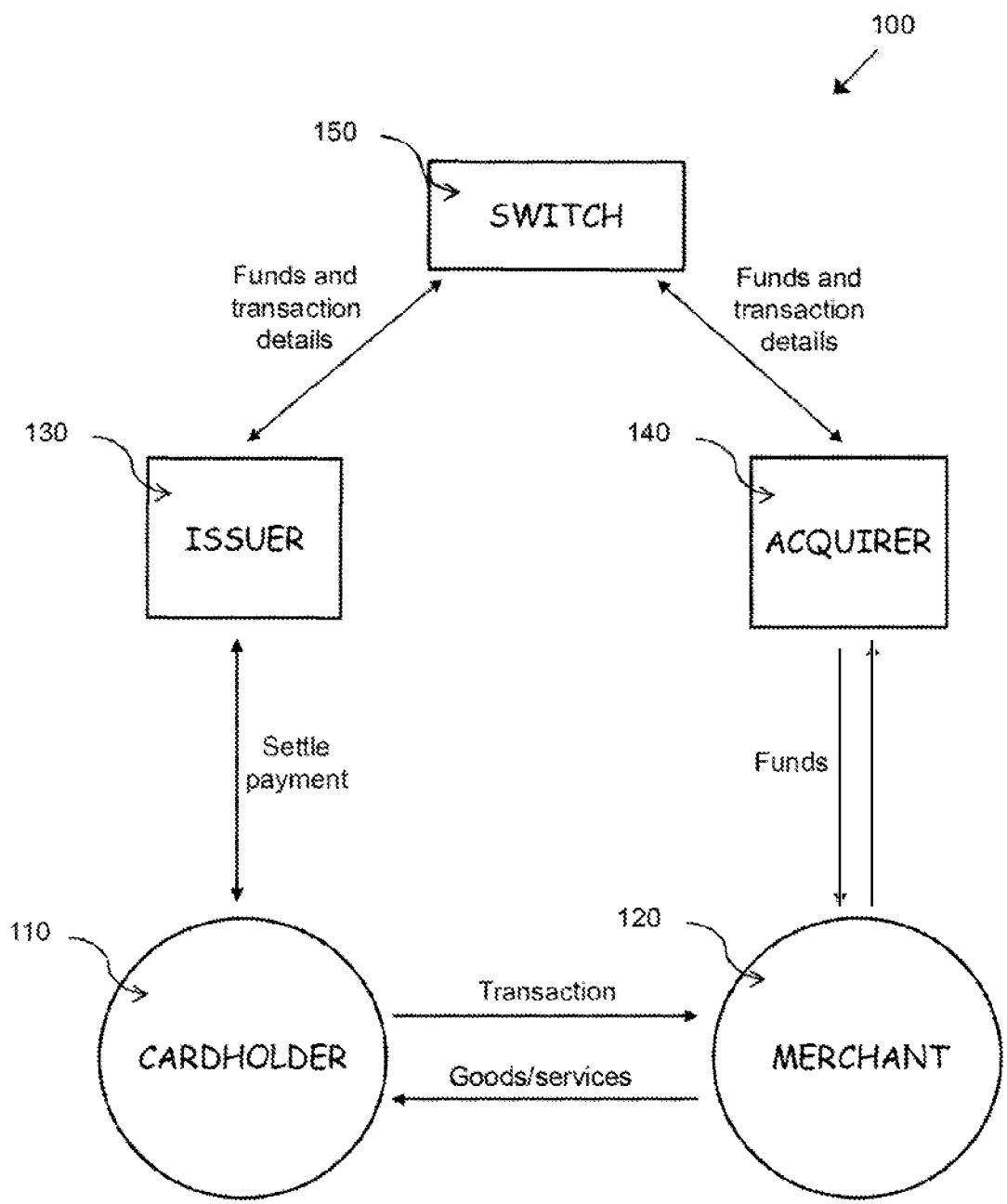
FIG. 7 shows schematically a transaction system using the four-party model.

FIG. 7 is a block diagram of a typical four-party model or four-party payment transaction scheme. The diagram illustrates the entities present in the model and the interactions occurring between entities operating in a card scheme.

Payment cards such as credit cards and debit cards are very widely used for all forms of financial transaction. The use of payment cards has evolved significantly with technological developments over recent years. Originally, transactions were on paper, using an imprint of a transaction card and confirmed by a signature. This approach was largely replaced by use of a magnetic stripe of a transaction card swiped through a magnetic stripe reader on a point of sale (POS) terminal to perform a transaction. Transaction cards developed to contain an integrated circuit ("chip cards" or "smart cards") that communicates with a smart card reader in the POS terminal. Cards of this type typically operate under the EMV standard for interoperation of chip cards and associated apparatus (such as POS terminals and ATMs). ISO/IEC 7816 provides a standard for operation of cards of this type. Contactless payments are now possible between suitably enabled payment cards or devices and merchant terminals by short range wireless technology using NFC protocols—under EMV, these are covered under the ISO/IEC 14443 standard. Payment cards and devices are provided under a transaction scheme (also called card scheme) and the transaction mechanism is mediated by the transaction scheme infrastructure.

EMV specifications relate to contact and contactless payment protocols and are publicly available at the EMVCo website (EMVCo is the industry body tasked with maintaining these specifications with the support of major transaction scheme providers)—https.//www.emvco.com/document-search/—and would readily be consulted by the person skilled in the art. Terminology relating to EMV technology not expressly defined in this document is referenced and defined in EMV specifications, as will be appreciated by the person skilled in the art.

Normally, card schemes—payment networks linked to payment cards—are based on one of two models: a three-party model or a four-party model (adopted by the present applicant). For the purposes of this document, the four-party model is described in further detail below.

The four-party model may be used as a basis for the transaction network. For each transaction, the model comprises four entity types: cardholder 110, merchant 120, issuer 130 and acquirer 140. In this model, the cardholder 110 purchases goods or services from the merchant 120. The issuer 130 is the bank or any other financial institution that issued the card to the cardholder 110. The acquirer 140 provides services for card processing to the merchant 120.

The model also comprises a central switch 150—interactions between the issuer 130 and the acquirer 140 are routed via the switch 150. The switch 150 enables a merchant 120 associated with one particular bank acquirer 140 to accept payment transactions from a cardholder 110 associated with a different bank issuer 130.

A typical transaction between the entities in the four-party model can be divided into two main stages: authorisation and settlement. The cardholder 110 initiates a purchase of a good or service from the merchant 120 using their card. Details of the card and the transaction are sent to the issuer 130 via the acquirer 140 and the switch 150 to authorise the transaction. Should the transaction be considered higher risk by the issuer 130, the cardholder 110 may be required to undergo an additional verification process to verify their identity and the details of the transaction. Once the additional verification process is complete the transaction is authorised.

On completion of the transaction between the cardholder 110 and the merchant 120, the transaction details are submitted by the merchant 120 to the acquirer 140 for settlement.

The transaction details are then routed to the relevant issuer 130 by the acquirer 140 via the switch 150. Upon receipt of these transaction details, the issuer 130 provides the settlement funds to the switch 150, which in turn forwards these funds to the merchant 120 via the acquirer 140.

Separately, the issuer 130 and the cardholder 110 settle the payment amount between them. In return, a service fee is paid to the acquirer 140 by the merchant 120 for each transaction, and an interchange fee is paid to the issuer 130 by the acquirer 140 in return for the settlement of funds.

In practical implementations of a four-party system model, the roles of a specific party may involve multiple elements acting together. This is typically the case in implementations that have developed beyond a contact-based interaction between a customer card and a merchant terminal to digital implementations using proxy or virtual cards on user computing devices such as a smart phone.

Figure 8:
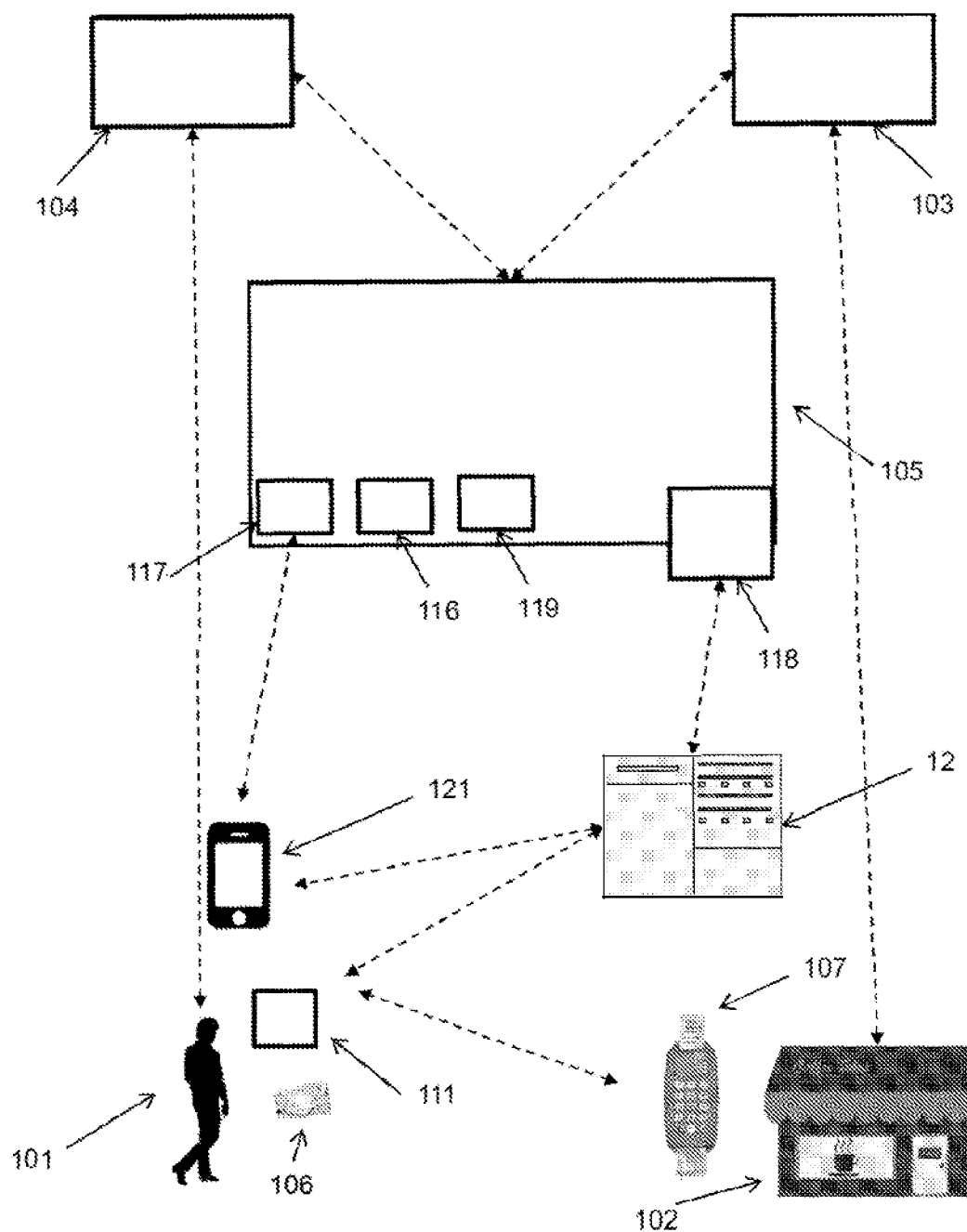
FIG. 8 shows an implementation of the transaction system of FIG. 7 adapted for performing embodiments of the disclosure.

FIG. 8 shows an architecture according to an embodiment of the disclosure appropriate for interaction between a cardholder and a merchant, illustrating specifically how this is adapted to support an online transaction between a consumer device (a computing device used by a consumer to conduct online transactions) and a merchant server.

In general the cardholder 101 uses their computing device—which may be any or all of a cellular telephone handset, a tablet, a laptop, a static personal computer or any other suitable computing device (here a personal computer 111 and a cellular telephone handset or smartphone 121 are shown as alternatives)—this can be used as a way to use card information in a client/server interaction or to act directly as a proxy for a physical payment card 106 or as a virtual payment card operating only in a digital domain. The smartphone 121 achieves this with a mobile payment application and a digital wallet, as described below. The smart phone 121 is thus able to transact with a merchant POS terminal 107 using NFC or another contactless technology. However, online transactions are of particular interest in connection with embodiments of the disclosure, rather than contact or contactless transactions with a merchant POS terminal 107. To make an online transaction, the user's computing device—for example personal computer 111—may also be able to interact with a merchant server 12 representing the merchant 2 over any appropriate network connection, such as the public internet. Any other suitable computing device may be used by the cardholder 1 to carry out an online transaction in this way.

The transaction scheme infrastructure (transaction infrastructure) 105 here provides not only the computing infrastructure necessary to operate the card scheme and provide routing of transactions and other messaging to parties such as the acquirer 103 and the issuer 104, but also a wallet service 117 to support a digital wallet on the cardholder computing device, and an internet gateway 118 to accept internet based transactions for processing by the transaction infrastructure. In other embodiments, the wallet service 117 may be provided similarly by a third party with an appropriate trust relationship with the transaction scheme provider. To support tokenisation, a token service provider 119 is present (again, this is shown as part of transaction infrastructure 105 but may be provided by a third party with appropriate trust relationships), and the transaction scheme infrastructure provides a digital enablement service 116 to support the performance of tokenised digital transactions, and to interact with other elements of the system to allow transactions to be performed correctly.

For a tokenised transaction, the transaction is validated in the transaction scheme by mapping the cardholder token to their card PAN, checking the status of the token (to ensure that it is in date and otherwise valid), any customer verification approach used and any validation of cryptographic proof to the transaction. This allows the issuer to authorise the transaction in the normal manner.

As the person skilled in the art will appreciate, modifications and variations to the above embodiments may be provided, and further embodiments may be developed, without departing from the spirit and scope of the disclosure. Reference to standards and proprietary technologies are provided for the purpose of describing effective implementations, and do not limit the scope of the disclosure.

The invention claimed is:

1. A method of maintaining a secure relationship between a server and a client device implementing a browser, the method comprising at the client device:
  receiving a first message comprising a first challenge from the server and determining and providing a first response to the first challenge, the first challenge comprising at least a set of coordinates and colors of an image to be rendered by the client device, wherein a resulting rendered image is specific to at least a graphics processing unit (GPU) of the client device;
  establishing a cookie associated with the secure relationship;
  providing the cookie to the server to maintain the secure relationship;
  receiving a second message, after providing the first response to the first challenge, the second message comprising the first challenge and a second challenge from the server; and
  determining the first response and a second response to the second challenge, and providing a composite response from which the first response and the second response are derivable by the server;
  wherein each challenge uses a challenge function adapted to provide a fingerprint of a combination of the client device and the browser.

2. The method of claim 1, wherein the fingerprint of the client device is a fingerprint of a device and browser combination for the client device.

3. The method of claim 2, wherein the challenge function relates to rendering by the browser of the client device.

4. The method of claim 3, wherein the challenge function comprises JavaScript routines relating to rendering by the browser using a process that comprises one or more of Canvas and WebGL functions.

5. The method of claim 1, wherein the client device is adapted to generate a seed and provides the seed to the server as part of the composite response, the client device uses the seed to generate a message authentication code derived from the first response, and wherein the client device receives random data from the server, and wherein the composite response comprises a first response part generated by operation of the message authentication code on the random data.

6. The method of claim 1, wherein the composite response has a second response part comprising the second response encrypted by the first response.

7. The method of claim 1, wherein the cookie is stored at the client device but none of the challenges or the responses are stored at the client device.

8. A computing device comprising a processor, a memory and a communication means, wherein the computing device is adapted to carry out the method of claim 1.

9. A method of maintaining a secure relationship between a server and a client device implementing a browser, the method comprising at the server:
  establishing a first challenge and receiving a first response to the first challenge from the client device, the first challenge comprising at least a set of coordinates and colors of an image to be rendered by the client device, wherein a resulting rendered image is specific to at least a graphics processing unit (GPU) of the client device;
  establishing a cookie associated with the secure relationship wherein the cookie is shared with the client device;
  receiving the cookie from the client device to maintain the secure relationship;
  determining a second challenge, and providing the first challenge and the second challenge to the client device after receiving the first response to the first challenge from the client device;
  receiving a composite challenge response from the client device, and deriving the first response and a second response to the second challenge from the composite challenge response;
  wherein each challenge uses a challenge function adapted to provide a fingerprint of a combination of the client device and the browser.

10. The method of claim 9, wherein the fingerprint of the client device is a fingerprint of a device and browser combination for the client device.

11. The method of claim 10, wherein the challenge function relates to rendering by the browser of the client device.

12. The method of claim 9, wherein the server rejects the composite response if it is received more than a predetermined time after the first challenge and second challenge are sent to the client device.

13. The method of claim 9, wherein the server provides random data with the first challenge and the second challenge, and wherein the composite response comprises a first response part involving the operation of the first response on the random data by which the server then validates that the client device has produced the first response.

14. The method of claim 9, wherein the composite response comprises a second response part comprising the second response encrypted by the first response, wherein the server uses the first response to decrypt the second response.

15. A server comprising a processor, a memory and communication means and adapted to perform the method of claim 9.

* * * * *